(12) United States Patent
Flora

(10) Patent No.: US 6,971,754 B2
(45) Date of Patent: Dec. 6, 2005

(54) LENS CAP RETENTION ARRANGEMENT

(75) Inventor: Lapthe Chau Flora, Roanoke, VA (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 21 days.

(21) Appl. No.: 10/712,637

(22) Filed: Nov. 13, 2003

(65) Prior Publication Data
US 2005/0105187 A1 May 19, 2005

(51) Int. Cl.$^7$ .......................... G03B 11/04; G02B 7/02
(52) U.S. Cl. ...................... 359/511; 359/611; 359/819; 396/448
(58) Field of Search ................ 359/507–511, 600–614, 359/800–830, 399–409, 368–390, 350–361; 250/214 VT; 396/448, 422, 535; 42/120, 42/129; D16/132

(56) References Cited

U.S. PATENT DOCUMENTS

| 4,383,565 A | * | 5/1983 | Denmat ................... 206/316.1 |
| 5,150,528 A | | 9/1992 | Shire |
| 5,396,069 A | | 3/1995 | Craig et al. .................. 250/330 |
| 5,467,479 A | | 11/1995 | Mattes ........................... 2/6.3 |
| 5,469,578 A | | 11/1995 | Mattes ........................... 2/6.7 |
| 5,675,145 A | * | 10/1997 | Toda et al. .................. 250/234 |
| 5,703,354 A | | 12/1997 | Wannagot et al. ..... 250/214 VT |
| 5,867,313 A | | 2/1999 | Schweitzer et al. ......... 359/418 |
| D413,130 S | | 8/1999 | Bryant et al. .............. D16/132 |
| 5,943,174 A | | 8/1999 | Bryant et al. ............... 359/809 |
| 6,094,300 A | * | 7/2000 | Kashima et al. ............ 359/385 |
| 6,449,087 B2 | * | 9/2002 | Ogino ........................ 359/383 |
| 6,580,518 B2 | * | 6/2003 | Eda et al. ................... 356/609 |
| 6,680,845 B2 | * | 1/2004 | Agata et al. ................ 361/683 |

FOREIGN PATENT DOCUMENTS

| DE | 102 01 515 A1 | | 8/2003 | |
| JP | 2-118534 | * | 5/1990 | ................ 359/511 |
| JP | 2000-275529 A | | 10/2000 | |
| JP | 2000-305132 | * | 11/2000 | ................ 359/511 |
| JP | 2001-318403 | * | 11/2001 | ................ 359/511 |

OTHER PUBLICATIONS

English translation of the Japanese reference No. 2-118534.*

* cited by examiner

Primary Examiner—Thong Q Nguyen
(74) Attorney, Agent, or Firm—RatnerPrestia

(57) ABSTRACT

Vision enhancing apparatus includes a lens and tethered lens cap which protects the lens when the apparatus is not in use. The apparatus also includes a protrusion having a shape complementary to the lens cap for retaining the latter when the apparatus is in use.

10 Claims, 2 Drawing Sheets

LENS CAP RETENTION ARRANGEMENT

FIELD OF THE INVENTION

This invention relates to a vision enhancing apparatus, for example, a night vision device, and, more particularly, to such apparatus having an arrangement for stowing a lens cap when the apparatus is in use.

BACKGROUND OF THE INVENTION

Vision enhancement apparatus of various types includes a lens assembly having an objective lens that receives light from the image to be viewed. In many such apparatus there is provided a lens cap that fits over the lens to protect it during periods when the apparatus is not in use. When the apparatus is in use the lens cap is removed, and, at such times, it is desirable to keep the lens cap associated with the apparatus so that the cap does not become lost and so that it can readily be reassembled with the lens when the device is not in use. One solution has been to tether the lens cap to the apparatus so that it is not disassociated from the apparatus during its use. However, in periods of nonuse the tethered lens cap dangles from the apparatus and can become entangled with the user, the user's clothing, or accessory devices being operated by the user.

In certain applications, for example, night vision devices used by military personal, the tethered, dangling lens cap can be buffeted by the winds and such wind action increases the probability of entanglement. In particularly adverse high wind conditions, or when the device is used on fast moving vehicles, the lens cap can be so violently blown about that it strikes the user's face and creates a distraction that impedes the user's mission.

Accordingly. It is desirable to provide a vision enhancing apparatus having an arrangement for stowing a lens cap in an out of the way, easily accessible place. It is also desirable to provide such an arrangement that obviates the problems caused by a tethered, dangling lens cap.

SUMMARY OF THE INVENTION

This invention includes an image enhancing apparatus having a vision enhancing device including a lens operatively arranged therein. The device is associated with a lens cap that fits over the lens to protect it from damage when the module is not in use. Also included is a protrusion formed on the device that has a shape complementary to the lens cap so that the lens cap can be removed from the lens and removably retained on the protrusion when the device is in use.

In the preferred embodiment disclosed herein the vision enhancing apparatus includes an image intensifier device including a housing and a lens operatively arranged therein for receiving low intensity light. The apparatus also includes a mounting adapter secured to the housing and which adapter is used to secure the housing to an accessory. The lens cap is configured so that it is removably retained on the housing. The protrusion is conveniently part of the device or the adapter.

BRIEF DESCRIPTION OF THE DRAWINGS

For a better understanding of the invention, reference is made to the following detailed description of a preferred embodiment taken in conjunction with the figures of the accompanying drawing in which.

DETAILED DESCRIPTION OF A PREFERRED EMBODIMENT

Figure 1:
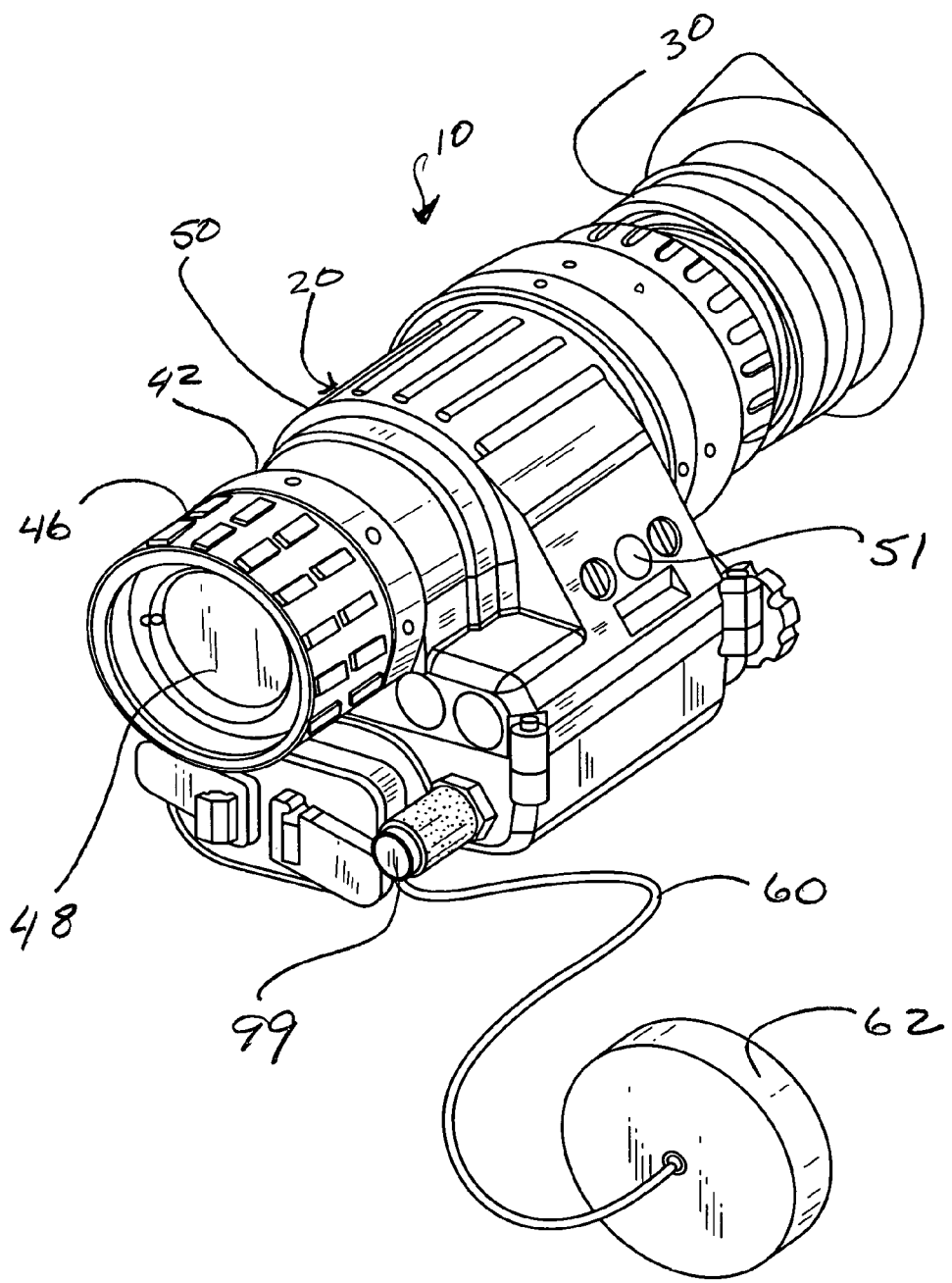
FIG. 1 is an perspective view of a night vision monocular with a tethered lens cap; and, FIG. 2 is a different perspective view of the monocular illustrated in FIG. 1 including a mounting adapter on which the lens cap can be stowed when the monocular is in use.

The preferred embodiment of the invention disclosed herein is a monocular night vision apparatus 10 of the type illustrated and disclosed in U.S. Pat. No. 5,943,174, issued to Bryant et al. on Aug. 24, 1999. The disclosure of the Bryant et al. patent is incorporated herein.

The monocular night vision apparatus 10 includes an image intensifier device 20 carried in a housing 50. The housing 50 includes an objective lens assembly 42 and an eye piece lens assembly 30. The housing 50 also includes a cylindrical barrel portion 46 in which an objective lens 48 is mounted for receiving low intensity light. It should be understood that the lens 48 is part of the objective lens assembly 42. Although not shown in the drawing. It should also be understood that the eye piece assembly 30 includes a lens for viewing a visible image. An image intensifier tube is located in the housing 50 for converting the low intensity light to a visible image. Such image intensifier tubes are well known in the art and need not be described herein.

The housing 50 is operatively associated with various protrusions, such as knobs or the like, and one particular knob 99 is shown herein. The knob 99 is an external gain control knob 99 which extends from the lower portion of the housing 50 and allows a user to variably adjust the gain of the image intensifier tube to the desired level for optimal performance. In the embodiment disclosed herein, the knob 99 also serves as a first anchor point for a cord 60 which tethers a lens cap 62 to the housing 50. The cord 60 can be nylon or a flexible cable or any suitable material. It should be understood, however, that the cord 60 can be attached to any suitable protrusion or even to an eyelet formed on the housing 50.

The lens cap 62 is a cup shaped member, i.e., has a circular end face and a cylindrical wall. It is of a size and shape to fit over the cylindrical portion 46 of the housing 50 with a slight interference fit. When the lens cap 62 is retained on the cylindrical portion 46, it covers the lens 48 and protects the lens during periods when the monocular 10 is not in use. Because of the interference fit, the lens cap 62 is readily removable from the cylindrical portion 46. While the lens cap 62 in this embodiment fits over the cylindrical portion 46 with an interference fit, the lens cap 62 can be retained with the housing 50 by any suitable connection, for example, via a threaded arrangement, bayonet slot arrangement or the like.

The housing 50 also includes a mounting socket 51 in the form of an internally threaded bore that the purpose of which will be made clear hereinafter.

Figure 2:
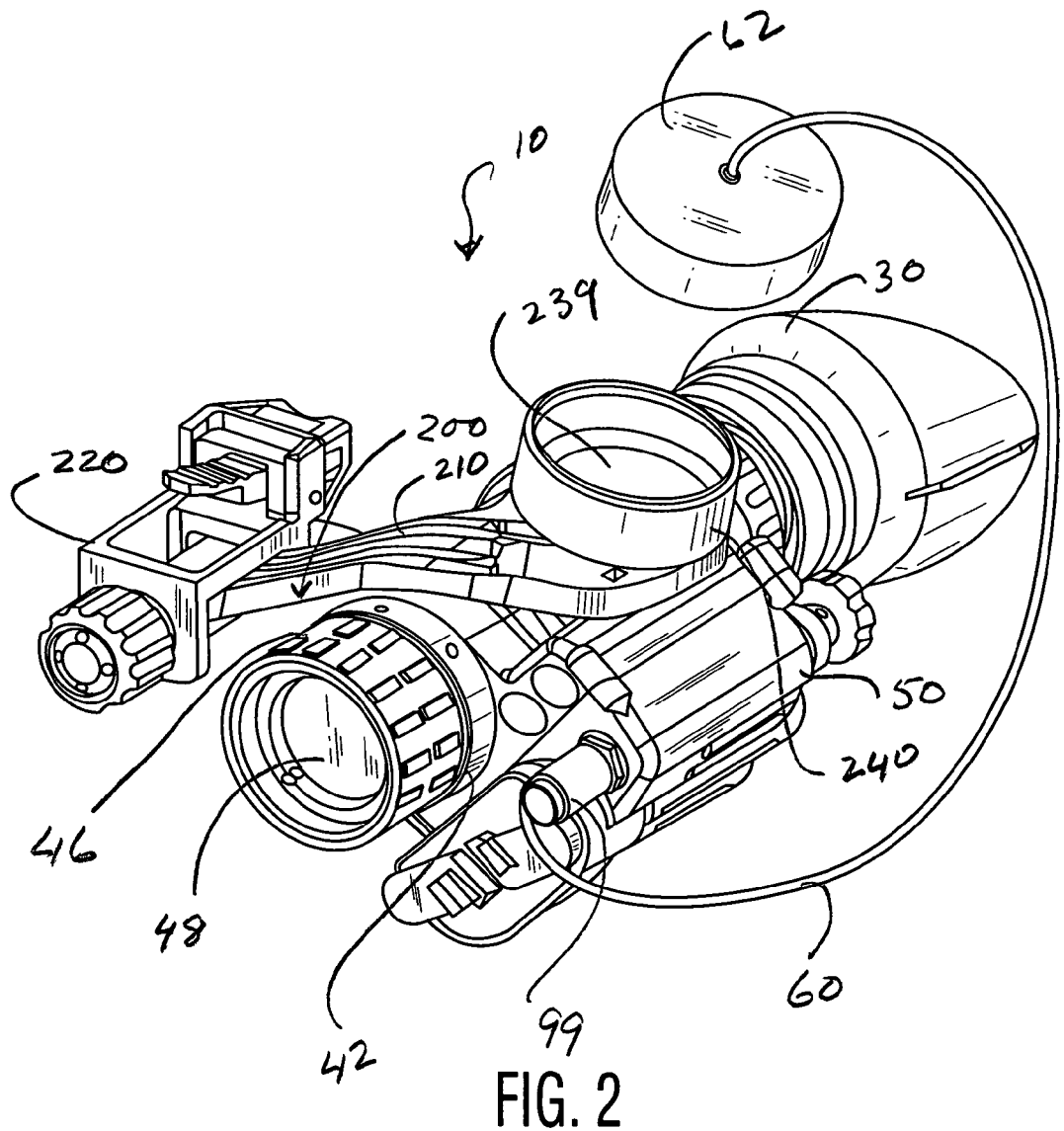

Referring now to FIG. 2, there is shown a mounting adapter 200 that is operative to secure the monocular 10 to a head mount or helmet mount carried on a head harness or helmet worn by the user. The construction of the mounting adapter 200 is the same as that disclosed in the above-reference Bryant et al. patent. It should also be understood that other mounting adapters can be used, for example, the small arms mounting adapter disclosed in the above referenced Bryan et al. patent. The mounting adapter 200 includes an adjustable mounting arm 210 which can be rotated so that the monocular device 10 can be positioned in front of either the left or right eye of the user. One end of the arm 210 includes a bracket assembly 220 adapted to fit with a head or helmet mount to secure the apparatus 10 in a hands free, usable condition for the user. Such mounts are well known in the art. At its other end, the mounting arm 210 is formed with an opening to receive a fastener 239 in the form of a screw having a threaded shank that cooperates with the mounting socket 51 to secure the mounting adapter 200 to the housing 50. The fastener 239 has an enlarged head 240 that allows the user to rotate the screw to attach or remove the mounting adapter 200 to or from the housing 50.

Conveniently the fastener 239 is a thumb screw. It's enlarged head 240 provides a protrusion for retaining the lens cap 62 when the apparatus 10 is in use. The head 240 has the same shape and dimension as the cylindrical portion 46 of the lens assembly 42. Accordingly, the head 240 has a circular cross sectional configuration having about the same diameter as the cylindrical portion 46 so that the lens cap 62 can be retained on the enlarged head 240 with slight interference fit. The configuration of the cylindrical portion 46 and the enlarged head 240 are preferably the same, but their diameters can differ so long as the lens cap 62 fits these members with a slight interference.

When the monocular is not in use, the lens cap 62 fits over the cylindrical portion 46 of the housing and is retained thereon to protect the lens 48 of the objective lens assembly. When the monocular is in use, the user removes the lens cap from the cylindrical portion 46 and places it over the enlarged head 240 of the screw 239 so that the lens cap is retained thereon. Thus, the lens cap 62 does not dangle and cannot become entangled with the user, the user's clothing or a nearby accessory. Being retained in a stationary position, the lens cap 62 can not be buffeted by the wind and strike the face of a user.

While the invention is disclosed in the context of a monocular night vision device. It should be understood that it could be used with other vision enhancing apparatus. It should also be understood that the lens cap 62 need not be tethered and if it is, it need not be tethered to the housing 50; it could be tethered to the adapter 200. Moreover, if no adapter is utilized, a protrusion similar to the enlarged head 240 can be formed on the housing 50 to retain the lens cap when the vision enhancing device is in use.

Various modifications and changes can be made to the preferred embodiment disclosed herein without departing from the spirit and scope of the appended claims.

What is claimed:

1. A night vision assembly comprising:
   an image intensifier device including a housing and a lens assembly operatively arranged therewith for receiving low intensity light; a mounting adapter secured to said housing, said adapter being adapted to be secured to an accessory; a lens cap configured to be removably retained on said lens assembly to protect a lens operatively associated with said lens assembly when said device is not in use; a fastener on one of said device or said adapter, said fastener having an enlarged head with a shape complementary to said lens cap so that said lens cap can be removed from said lens assembly and retained on said head with an interference fit when said assembly is in use.

2. A night vision assembly according to claim 1 wherein said fastener secures said adapter to said device.

3. A night vision assembly according to claim 2 wherein said lens cap and said head have cross-sectional circular configurations with slightly different diameters to provide the interference fit.

4. A night vision assembly according to claim 2 wherein said fastener is a threaded screw.

5. A night vision assembly according to claim 1 wherein said lens assembly has a cylindrical portion extending from said housing and wherein said cylindrical portion and said head have the same configuration and diameter for retaining said lens cap.

6. A night vision assembly according to claim 1 wherein said lens cap is tethered to said device.

7. A night vision monocular comprising:
   an image intensifier housing having a cylindrical portion extending beyond said housing and having a first cross-sectional diameter, an objective lens carried in said cylindrical portion for receiving low intensity light, said housing also carrying an eyepiece for viewing a visible image;
   a lens cap tethered to said housing and having a circular cross-section having a diameter slightly different from said first diameter so that said lens cap can be removably retained on said cylindrical portion of said housing with an interference fit to cover and protect said objective lens when said monocular is not in use;
   a mounting adapter secured to said housing by a fastener, said adapter also including a bracket operative to secure said adapter to an accessory;
   said fastener having an enlarged head with a circular cross-section having a diameter substantially equal to said first diameter whereby said lens cap can be removably retained on said enlarged head with an interference fit when said monocular is in use.

8. A night vision assembly comprising:
   an image intensifier device including a housing with a lens assembly having a generally cylindrical portion extending therefrom, said lens assembly arranged for receiving low intensity light; a lens cap configured to be removably retained on said generally cylindrical portion with an interference fit to protect a lens operatively associated with said lens assembly when said device is not in use; a fastener operatively associated with said device, said fastener including an enlarged head having substantially the same cross-sectional shape and dimension as said generally cylindrical portion so that said lens cap can be removed from said generally cylindrical portion and retained on said head with an interference fit when said device is in use.

9. A night vision assembly according to claim 8 wherein said fastener is a threaded screw.

10. A night vision assembly according to claim 8 wherein said lens cap is tethered to said assembly.